United States Patent
Chuang (10) Patent No.: US 9,609,095 B2
(45) Date of Patent: *Mar. 28, 2017

(54) TIGHTLY RETAINED SYNCHRONOUSLY ROTATABLE DUAL-AXLE HINGE STRUCTURE

(71) Applicant: DEDA METALS COMPANY LIMITED, New Taipei (TW)

(72) Inventor: Kun-You Chuang, New Taipei (TW)

(73) Assignee: DEDA METALS COMPANY LIMITED, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/985,434

(22) Filed: Dec. 31, 2015

(65) Prior Publication Data

US 2016/0222707 A1 Aug. 4, 2016

(30) Foreign Application Priority Data

Jan. 30, 2015 (TW) .............................. 104103132 A (51) Int. Cl.
*E05D 7/00* (2006.01)
*H04M 1/02* (2006.01)
*G06F 1/16* (2006.01)
*E05D 3/14* (2006.01)

(52) U.S. Cl.
CPC .......... *H04M 1/022* (2013.01); *G06F 1/1681* (2013.01); *E05D 3/14* (2013.01); *E05Y 2900/606* (2013.01)

(58) Field of Classification Search
CPC .... E05D 3/12; E05D 3/06; E05D 3/10; E05D 3/122; E05D 11/06; E05D 2011/0072; E05D 11/0054; G06F 1/1681; G06F 1/1616; G06F 1/1618; E05Y 2900/606; H04M 1/0216; H04M 1/0222; H04M 1/022; Y10T 16/54038; Y10T 16/5403; Y10T 16/54033; Y10T 16/547; Y10T 16/5474; Y10T 16/5475
See application file for complete search history.

(56) References Cited

U.S. PATENT DOCUMENTS

| 8,959,720 B2* | 2/2015 | Hsu ....................... G06F 1/1681 16/303 |
| 9,103,147 B1* | 8/2015 | Chuang ................. G06F 1/1681 |
| 9,265,166 B2* | 2/2016 | Hsu ....................... H05K 5/0226 |
| 2009/0000062 A1* | 1/2009 | Yamanami ............ G06F 1/1616 16/366 |

(Continued)

*Primary Examiner* — Chuck Mah
(74) *Attorney, Agent, or Firm* — Leong C. Lei (57) ABSTRACT

A dual-axle hinge structure includes a dual axle assembly, at least one sleeve, and a contactor. The dual axle assembly includes first and second axles that are connected by and mutually push/pull each other through connection members for synchronous rotation. The sleeve is fit over and houses the first and axles. The contactor is arranged between the first and second axles and has two opposite sides respectively in contact engagement with surfaces of the first and second axles. By means of the tight retention achieved with the sleeve and the abutting engagement achieved with the two sides of the contactor, tight engagement is established among the sleeve, the first and second axles, and the contactor to allow for synchronous rotation, in a step-less manner, and positioning of the first axle and the second axle in a tightly retained condition.

6 Claims, 6 Drawing Sheets

(56) References Cited

U.S. PATENT DOCUMENTS

| | | | | |
|---|---|---|---|---|
| 2011/0289726 A1* | 12/2011 | Zhang | ................... | G06F 1/1681 16/250 |
| 2012/0192381 A1* | 8/2012 | Zhang | ................... | G06F 1/1681 16/366 |
| 2013/0318746 A1* | 12/2013 | Kuramochi | ........... | G06F 1/1681 16/342 |
| 2014/0338483 A1* | 11/2014 | Hsu | ........................ | F16H 21/44 74/96 |
| 2014/0352113 A1* | 12/2014 | Chen | .................... | H04M 1/022 16/366 |
| 2015/0013107 A1* | 1/2015 | Shin | .......................... | E05D 3/06 16/366 |
| 2015/0020351 A1* | 1/2015 | Lin | ........................ | E05D 11/06 16/366 |
| 2015/0040353 A1* | 2/2015 | Chen | .................... | G06F 1/1681 16/366 |
| 2015/0342068 A1* | 11/2015 | Su | ........................ | G06F 1/1681 16/354 |

* cited by examiner

TIGHTLY RETAINED SYNCHRONOUSLY ROTATABLE DUAL-AXLE HINGE STRUCTURE

TECHNICAL FIELD OF THE INVENTION

The present invention relates generally to a hinge, and more particularly to a tightly retained synchronously rotatable dual-axle hinge structure.

DESCRIPTION OF THE PRIOR ART

The progress of technology brings wide applications of liquid crystal displays (LCDs) as displays of electronic devices.

The liquid crystal displays have various advantages, such as high image quality, small size, reduced weight, low driving voltage, low power consumption, and wide applications, and have been widely used in consumer electronic devices or computer products, such as portable television, mobile phones, notebook computers, desktop computers, and projection televisions. Taking the notebook computers as an example, a liquid crystal display is attached to a top cover so that in an attempt to use the notebook computer, the top cover is lifted open to expose the liquid crystal display attached thereto. The top cover is coupled, through a hinge, to the computer to allow the top cover to be opened/closed with respect to the computer.

Thus, the hinge is one of the key factors that determines the product quality of the above discussed electronic products or computer products. To allow the casing of a screen and the housing of a keypad to be rotated to a desired angular position with respect to each other, a dual-axle hinge has been proposed. However, the conventional dual-axle hinge is structured such that the two axles are rotated independently so that when a user intends to open an electronic device by lifting the screen casing, the two axles may be individually rotated by different angles due to non-uniform application of force or differentiation of torque of the hinge, leading to undesired influence of the smoothness of opening the screen casing. It may be even worse that one of the two axles may be overly operated and thus suffers shortening of the service life thereof due to the two axles being independently operated at different frequency and different extents.

Interconnected dual-axle hinges are also available, such as Taiwan for a dual-axle hinge structure, in which the interconnection is achieved with a single link bar, so that the operation requires an increased force and no guarantee of a success operation of synchronous rotation may be achieved.

Among the interconnected dual-axle hinges that are currently available, there are also gear-based interconnected dual-axle hinges and rail-based interconnected dual-axle hinges. The gear-based interconnected dual-axle hinges are structured such that two axles are each provided with a gear structure formed thereon and a gear train mating the gear structures is arranged between the two axles in order to overcome the problems of the traditional dual-axle hinges. However, the gear train includes multiple gears that involves a complicated arrangement and this requires a precise design to achieve accurate and correct mating engagement for achieving the interconnection of diving coupling between the two axles. This surely makes the manufacturing and assembly complicated and difficult. Also, the gears are readily damaged and broken. The rail-based dual-axle hinge suffers instantaneous and unexpected derailing and the structure and performance are both imperfect.

The present invention aims to provide an improved dual-axle hinge that overcomes the drawbacks and shortcomings of the conventional dual-axle hinges.

SUMMARY OF THE INVENTION

An object of the present invention is to provide a tightly retained synchronously rotatable dual-axle hinge structure that uses tight retention achieved with a sleeve and abutting engagement achieved with two opposite sides of a contactor to allow for synchronous rotation, in a step-less manner, and positioning of a first axle and a second axle in a tightly retained condition.

To achieve the above object, the present invention comprises a dual axle assembly, at least one sleeve, and a contactor, wherein the dual axle assembly comprises a first axle, a second axle, and at least two connection members. The first axle comprises at least one first mounting slot. The second axle comprises at least one second mounting slot. The connection members each have two ends respectively received in and coupled to the first mounting slot and the second mounting slot in a movable manner. The sleeve is fit over and houses the first axle and the second axle. The contactor is arranged between the first axle and the second axle. The contactor has two opposite sides that comprise two arc surface segments, respectively. The arc surface segments are in contact engagement with surfaces of the first axle and the second axle.

By means of the tight retention achieved with the sleeve and the abutting engagement achieved with the two sides of the contactor, tight engagement is established among the sleeve, the first and second axles, and the contactor to allow for synchronous rotation, in a step-less manner, and positioning of the first axle and the second axle in a tightly retained condition.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
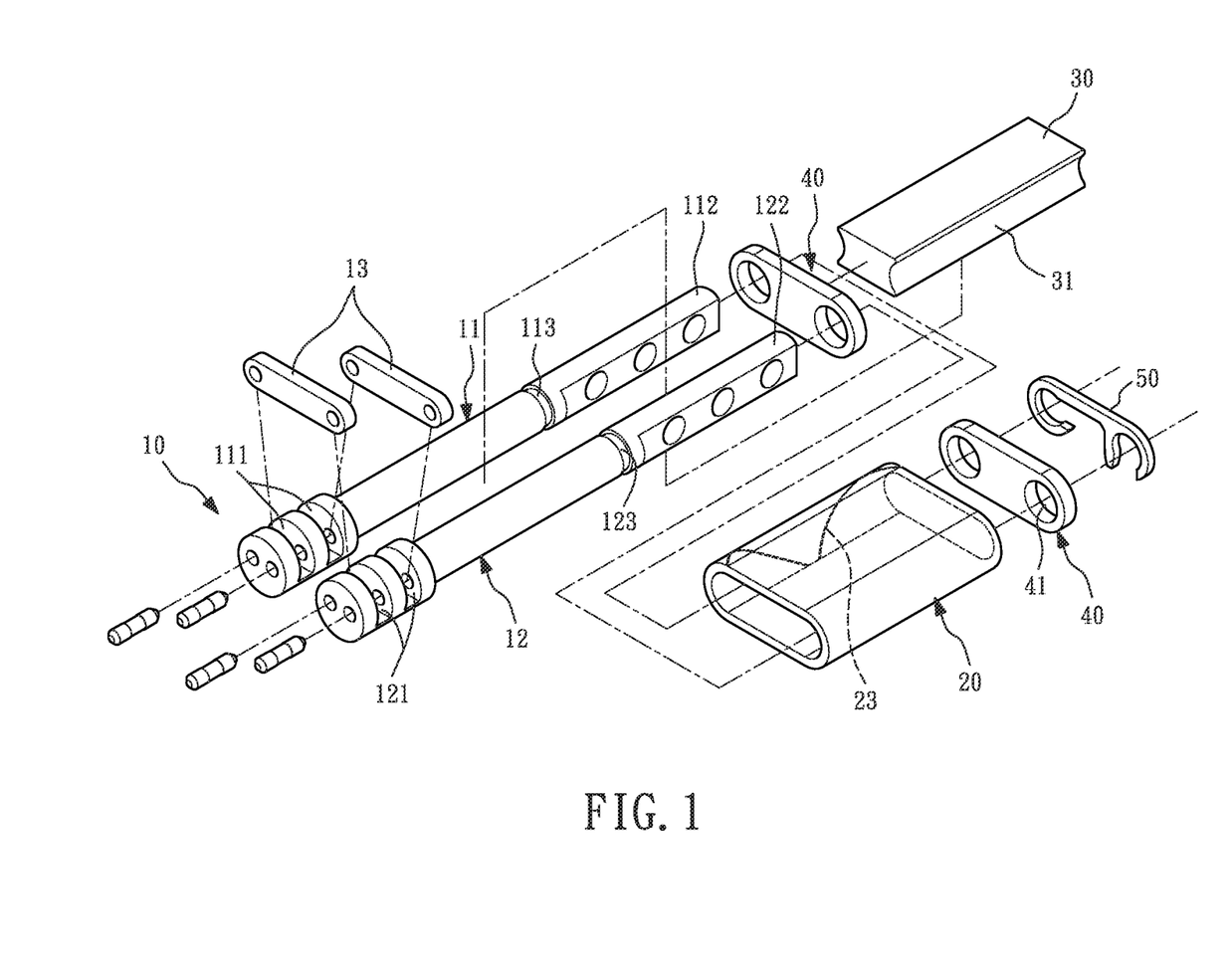
FIG. 1 is an exploded view of the present invention.
Figure 3:
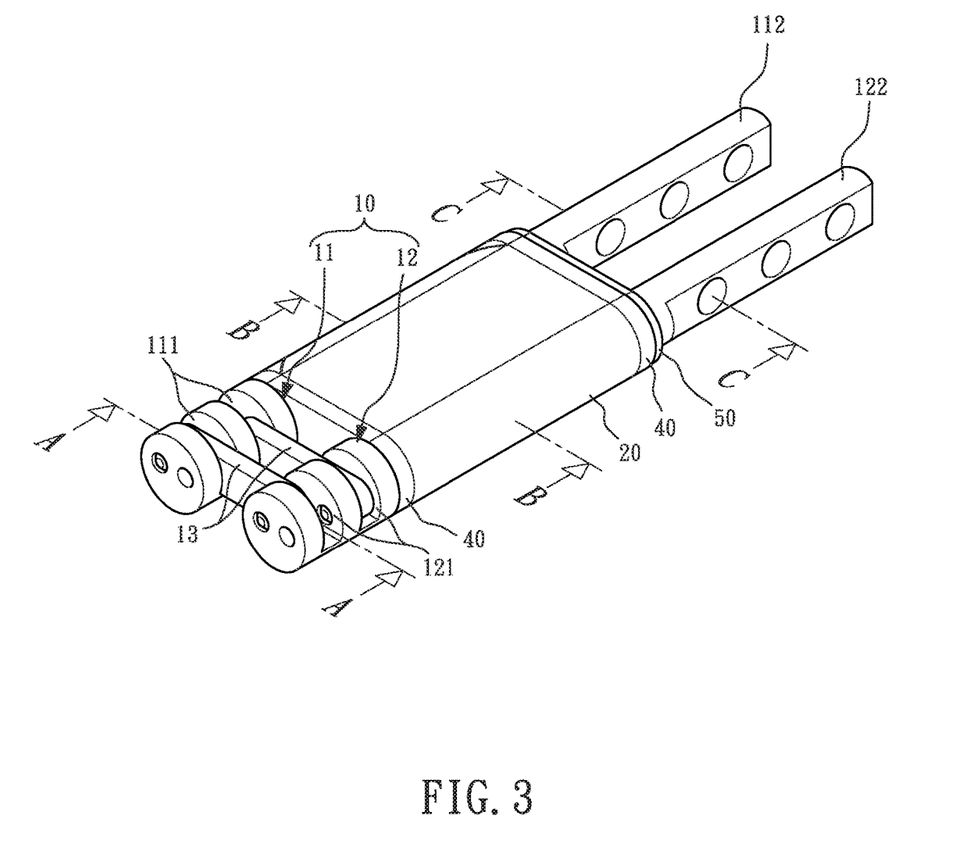
FIG. 3 is a perspective view of the present invention.
Figure 7:
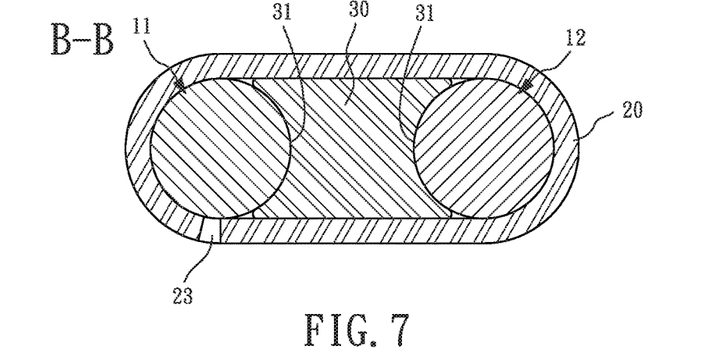
FIGS. 7-9 are cross-sectional views taken along line B-B of the present invention, illustrating an operation of synchronous rotation of first and second axles.

Referring to FIGS. 1, 3, and 7, the present invention comprises a dual axle assembly 10, at least one sleeve 20, and a contactor 30. Details will be explained below:

The dual axle assembly 10 comprises a first axle 11, a second axle 12, and two connection members 13. The first axle 11 comprises two first mounting slots 111. The second axle 12 comprises two second mounting slots 121. The connection members 13 each have two ends that are respectively received in and coupled to the first mounting slots 111 and the second mounting slots 121 in a movable manner.

The sleeve 20 is fit over and houses the first axle 11 and the second axle 12. The sleeve 20 defines therein a hollow area between the first axle 11 and the second axle 12 to receive the contactor 30 arranged therein.

The contactor 30 is located between the first axle 11 and the second axle 12. The contactor 30 has two opposite sides, which comprise two arc surface segments 31 respectively formed thereon. The arc surface segments 31 are structured to engage and contact surfaces of the first axle 11 and the second axle 12.

In an embodiment, the first axle 11 comprises a first mounting section 112. The first mounting section 112 is provided for coupling with one component of a device to be assembled, such as a top lid of a notebook computer. The second axle 12 comprises a second mounting section 122. The second mounting section 122 is provided for coupling with another component of the device to be assembled, such as a computer portion of the notebook computer.

In an embodiment, the present invention further comprises two retention members 40. The retention members 40 are connected to the first axle 11 and the second axle 12. In the instant embodiment, the retention members 40 are respectively arranged at opposite ends of the sleeve 20.

Further, the retention members 40 each comprise two through holes 41. The through holes 41 respectively receive the first axle 11 and the second axle 12 to extend therethrough and are connected therebetween.

In an embodiment, the first axle 11 comprises a first groove 113, and the second axle 20 comprises a second groove 123. The first groove 113 and the second groove 123 are structured to receive a support frame 50 to fit therein for coupling engagement. The support frame 50 supports and couples the first axle 11 and the second axle 12 together and also helps retain the retention members 40 and the sleeve 20 in position without loosening and detachment.

Figure 2:
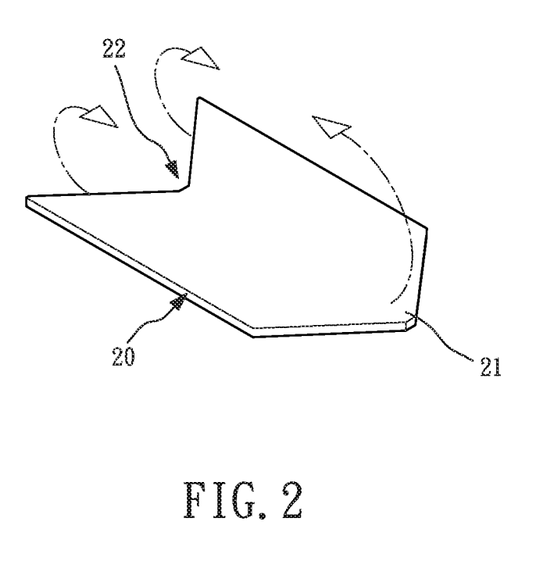
FIG. 2 is a schematic developed view illustrating a retention sleeve of the present invention.

Referring to FIG. 2, in an embodiment, before being shaped, the positioning sleeve 20 has an end that comprises at least one triangular projection 21 formed thereon and an opposite end that comprises at least one triangular recess 22 formed therein. The positioning sleeve 20 is curved in such a way that the triangular projection 21 is received in the triangular recess 22 to define a gap 23 therebetween. The gap 23 allows for elastic deformation when the positioning sleeve 20 is acted upon by a force pushing outward.

Figure 4:
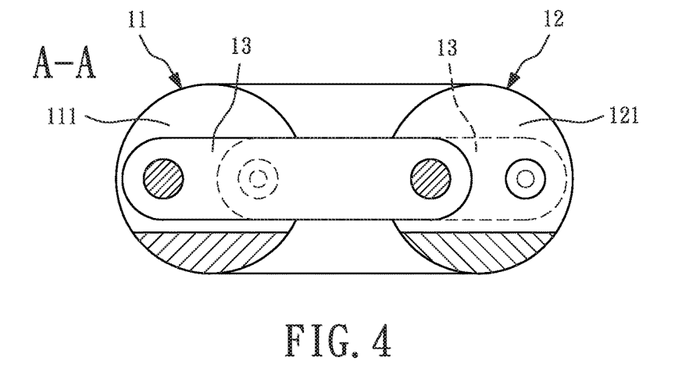
FIGS. 4-6 are cross-sectional views taken along line A-A of the present invention, illustrating an operation of synchronous rotation, in a step-less manner, and positioning of the first and second axles in a tightly retained condition.
Figure 5:
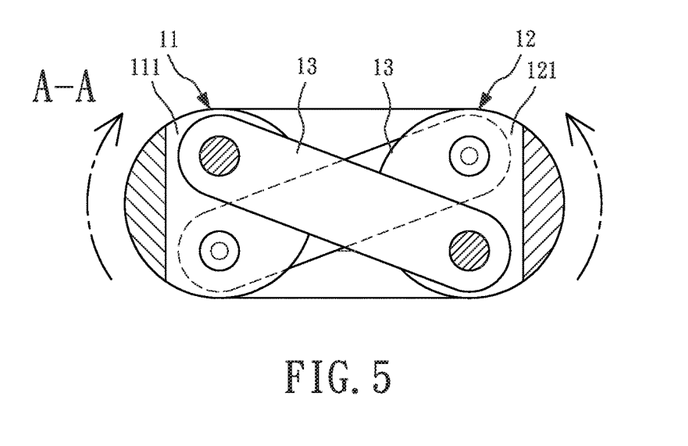
Figure 6:
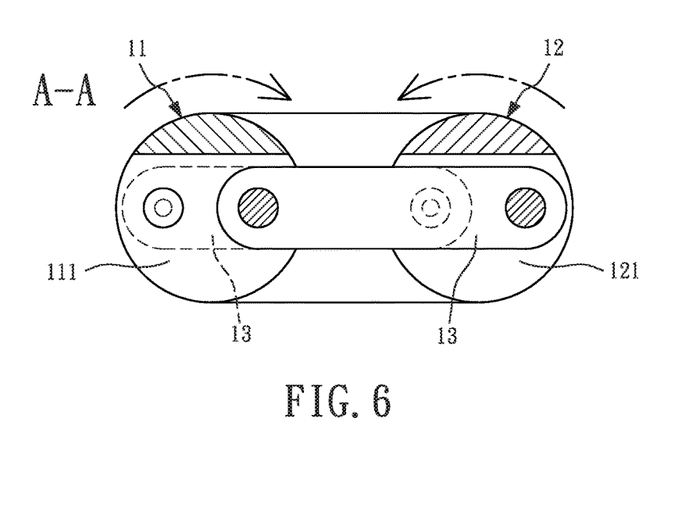

The components of the present invention have been described above and the operation thereof, as well as features, will be described as follows:

Referring to FIGS. 4, 5, and 6, the present invention is structured by having the connection members 13 connected between the first axle 11 and the second axle 12 such that when one of the first axle 11 and the second axle 12 is rotated, forces are induced between the first axle 11 and the second axle 12 for pushing and pulling at the same time. As such, the first axle 11 and the second axle 12 are subjected to both pushing and pulling therebetween so that the operation can be conducted in an effort-reduced manner and synchronous rotation can be achieved readily.

Figure 10:
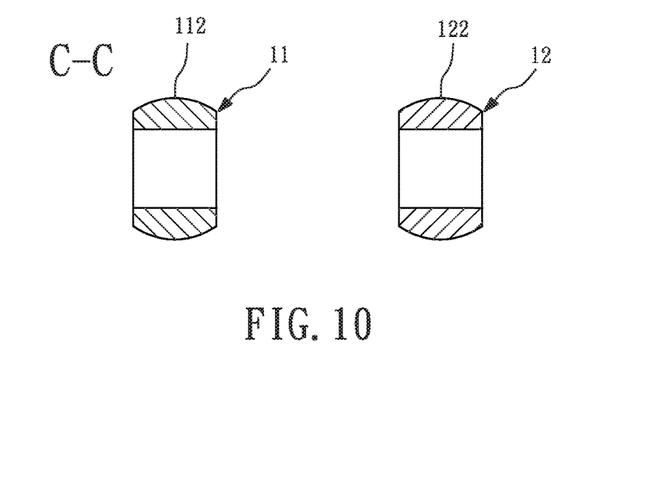
FIGS. 10-12 are cross-sectional views taken along line C-C of the present invention, illustrating an operation of synchronous rotation of first and second mounting sections
Figure 11:
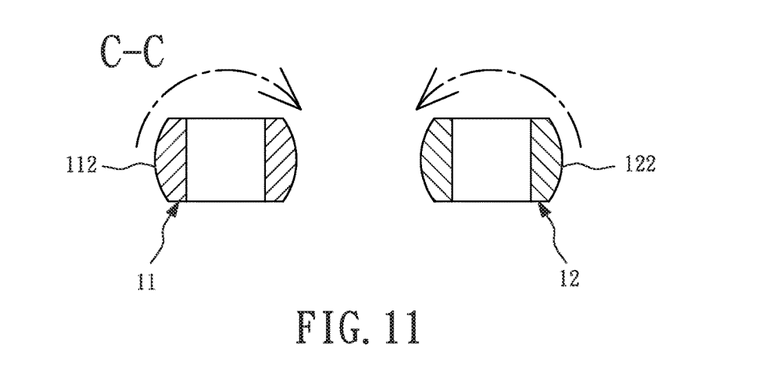
Figure 12:
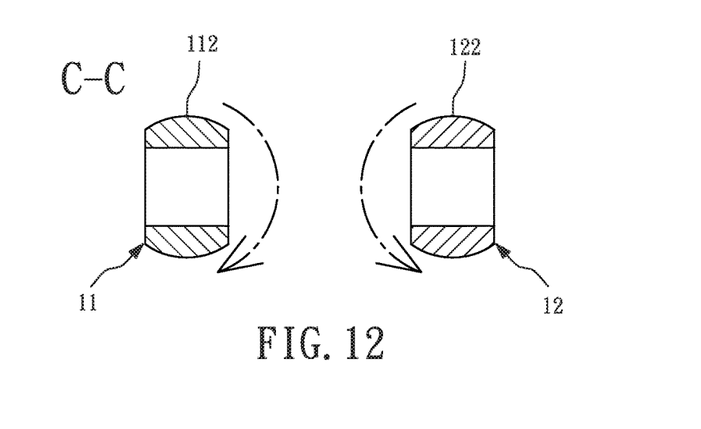

Referring to FIGS. 10, 11, and 12, when the first axle 11 and the second axle 12 are operated to synchronously rotate, the first mounting section 112 that is mounted to the first axle 11 and the second mounting section 122 that is mounted to the second axle 12 are driven to rotate in unison therewith.

Figure 8:
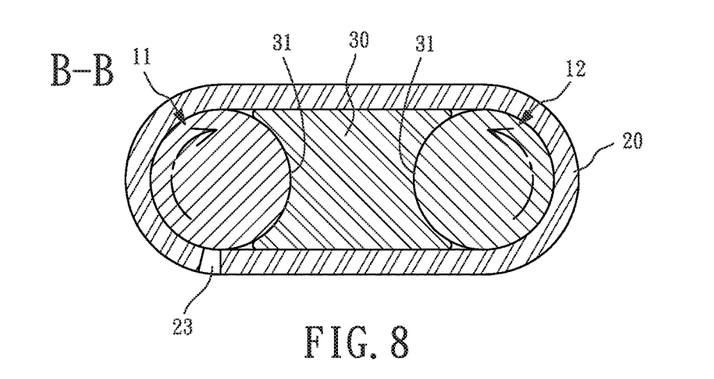
Figure 9:
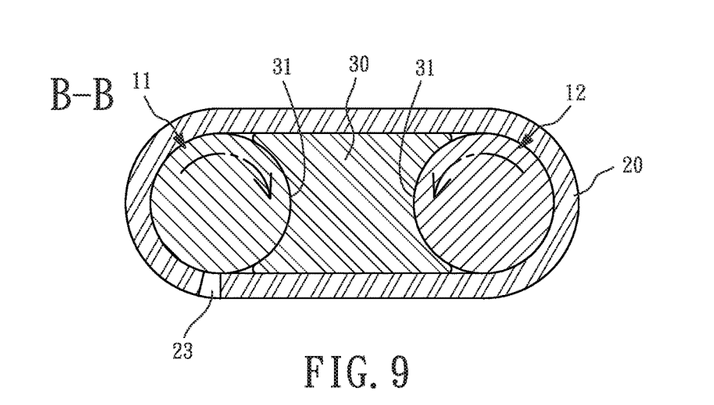

Referring to FIGS. 7, 8, and 9, the present invention makes use of tight retention achieved with the sleeve 20 and abutting engagement achieved with the arc surface segments 31 on the two sides of the contactor 30 to provide tight engagement among the sleeve 20, the first and second axles 11, 12, and the contactor 30 so that the first axle 11 and the second axle 12 are allowed to conduct synchronous rotation and positioning in a step-less manner under a tightly retained condition. In other words, the first axle 11 and the second axle 12 can be rotated in a condition of being tightly retained with predetermined tightness to allow a user to rotate the first axle 11 and the second axle 12 to any desired angular positions and also to properly position the first axle 11 and the second axle 12 after the rotation.

Based on the above-described structure and performance, the present invention is applicable to foldable electronic products that need a hinge, such as notebook computers, portable televisions, mobile phones, and display devices.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A dual-axle hinge structure, comprising:
    a dual axle assembly, which comprises a first axle, a second axle, and at least two connection members, the first axle comprising at least one first mounting slot, the second axle comprising at least one second mounting slot, each of the connection members having two ends respectively pivotally received in and coupled to the first mounting slot of the first axle and the second mounting slot of the second axle;
    at least one sleeve, which is fit over and houses the first axle and the second axle; and
    a contactor, which is arranged between the first axle and the second axle, the contactor having two opposite sides that comprises two arc surface segments respectively formed thereon, the arc surface segments being in contact engagement with surfaces of the first axle and the second axle respectively;

wherein when one of the first axle and the second axle is rotated, forces are induced between the first axle and the second axle for pushing and puling, and the first axle and the second axle are subjected to both pushing and pulling so that operation is conducted and synchronous rotation is achieved.

2. The dual-axle hinge structure according to claim 1, wherein the first axle comprises a first mounting section, the first mounting section being adapted to receive one component of a device to be assembled to couple therewith; and the second axle comprises a second mounting section, the second mounting section being adapted to receive another component of the device to be assembled to couple therewith.

3. The dual-axle hinge structure according to claim 1 further comprising two retention members, which are connected with the first axle and the second axle.

4. The dual-axle hinge structure according to claim 3, wherein the retention members each comprise two through holes, which receive the first axle and the second axle to extend therethrough respectively for connecting therebetween.

5. The dual-axle hinge structure according to claim 1, wherein the first axle comprises a first groove and the second axle comprises a second groove, the first groove and the second groove receiving a support frame to fit therein and couple therewith, the support frame supporting and coupling the first axle and the second axle together.

6. The dual-axle hinge structure according to claim 1, wherein the sleeve, before being shaped, has an end that comprises at least one triangular projection formed thereon and an opposite end that comprises at least one triangular recess formed therein, the sleeve being curved in such a way to form a gap between the triangular projection and the triangular recess.

* * * * *